(12) United States Patent
Saito (10) Patent No.: US 9,977,964 B2
(45) Date of Patent: May 22, 2018

(54) IMAGE PROCESSING DEVICE, IMAGE PROCESSING METHOD AND RECORDING MEDIUM

(71) Applicant: FUJIFILM CORPORATION, Tokyo (JP)

(72) Inventor: Masaki Saito, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 0 days. days.

(21) Appl. No.: 15/210,330

(22) Filed: Jul. 14, 2016

(65) Prior Publication Data

US 2017/0032187 A1 Feb. 2, 2017

(30) Foreign Application Priority Data

Jul. 31, 2015 (JP) .................................. 2015-152726

(51) Int. Cl.
| | |
|---|---|
| G06K 9/00 | (2006.01) |
| G06F 17/30 | (2006.01) |
| G06K 9/46 | (2006.01) |
| G06K 9/68 | (2006.01) |

(52) U.S. Cl.
CPC ... *G06K 9/00677* (2013.01); *G06F 17/30247* (2013.01); *G06K 9/00221* (2013.01); *G06K 9/00295* (2013.01); *G06K 9/4652* (2013.01); *G06K 9/6814* (2013.01)

(58) Field of Classification Search
None
See application file for complete search history.

(56) References Cited

U.S. PATENT DOCUMENTS

| | | | |
|---|---|---|---|
| 2009/0248703 A1 | 10/2009 | Tsukagoshi et al. | |
| 2013/0335582 A1 | 12/2013 | Itasaki et al. | |
| 2014/0010458 A1* | 1/2014 | Nakamura | G06F 17/30244 382/195 |
| 2014/0205158 A1* | 7/2014 | Fukazawa | G06K 9/00288 382/118 |
| 2015/0043831 A1* | 2/2015 | Arfvidsson | H04L 67/10 382/228 |
| 2015/0324630 A1* | 11/2015 | Sandler | G06K 9/6267 382/118 |
| 2016/0004695 A1* | 1/2016 | Yang | G06F 17/30247 707/738 |
| 2017/0093780 A1* | 3/2017 | Lieb | G06F 17/30265 |

FOREIGN PATENT DOCUMENTS

| | | |
|---|---|---|
| JP | 2009-259239 A | 11/2009 |
| JP | 2011-155385 A | 8/2011 |
| JP | 2014-002468 A | 1/2014 |

* cited by examiner

*Primary Examiner* — Delomia L Gilliard
(74) *Attorney, Agent, or Firm* — Studebaker & Brackett PC (57) ABSTRACT

In the image processing device, the image processing method and the recording medium, the instruction acquiring section acquires the instruction input by the first user. The image group selecting section selects, as the second image group, a part of images from the first image group owned by the first user based on the instruction. The image analyzer carries out image analysis on images contained in the first image group. And the image group extracting section extracts, as the third image group, at least a part of images having relevance to images contained in the second image group from the first image group except the second image group based on the result of image analysis on images contained in the first image group.

25 Claims, 7 Drawing Sheets

IMAGE PROCESSING DEVICE, IMAGE PROCESSING METHOD AND RECORDING MEDIUM

CROSS-REFERENCE TO RELATED APPLICATIONS

The present application claims priority under 35 U.S.C. § 119 to Japanese Patent Application No. 2015-152726, filed on Jul. 31, 2015. The above application is hereby expressly incorporated by reference, in its entirety, into the present application.

BACKGROUND OF THE INVENTION

The invention relates to an image processing device, an image processing method and a recording medium for extracting a part of images from an image group owned by a user.

In recent years, users who store images in online data storages have been increasing, as use of smartphones spreads, the online data storage services are provided at the lower costs with the larger capacity, and the functions linked between a smartphone and an online data storage are enhanced. For example, a smartphone can be set up such that an image taken by the smartphone can be backed up (stored) in an online data storage manually by the user, or automatically.

Accordingly, a great amount of images of users are stored in an online data storage. When images of a user stored in an online data storage are shared with other users who use the same service, the images can be readily exchanged therebetween.

Prior art references which are relating to the invention include JP 2011-155385 A, JP 2009-259239 A and JP 2014-2468 A.

JP 2011-155385 A describes calculating a candidate-for-sharing point for each person extracted from images based on the relationship between the image selected from a list by the user and other images, and displaying information on a person having a high candidate-for-sharing point as a candidate for sharing.

JP 2009-259239 A describes image sharing including determining a shared area to be shared in a sharer's album from an album of an image owner, and automatically changing a layout of the shared area based on the layout information of the sharer's album.

JP 2014-2468 A describes the information sharing server transmitting contents-storing information received from a first terminal to a second terminal according to an acquisition request of the contents on a basis of the sharing information received by the second terminal from the first terminal, and sharing information between the first terminal and the second terminal.

SUMMARY OF THE INVENTION

As described above, images can be shared with other users, but images owned by each user are merely stored in an online data storage and often fail to be shared by other users.

Immediately after an image is stored in an online data storage, the user clearly remembers in a trip with whom the image was taken, and with whom the image should be shared, for example. However, such memory will become unclear as the time lapses, and the user will be unsure with whom the image should be shared. In addition, the image stored in an online data storage will be buried in a large number of images subsequently taken, and thereby it will gradually be difficult to share the stored image.

Moreover, JP 2011-155385 A, JP 2009-259239 A and JP 2014-2468 A describe sharing information associated with a person or sharing images but do not describe a method for extracting, from a large number of images owned by a user, images matching the user's preferences, not only to be shared but also to be used for a particular utilization.

An object of the invention is to overcome the above problems of the prior art and provide an image processing device, an image processing method and a recording medium capable of accurately extracting, from a group of large number of images owned by a user, images matching the user's preference.

In order to attain the object described above, the present invention provides an image processing device including:

an instruction acquiring section configured to acquire an instruction input by a first user;

an image group selecting section configured to select, as a second image group, a part of images from a first image group owned by the first user based on the instruction;

an image analyzer configured to carry out image analysis on images contained in the first image group; and an image group extracting section configured to extract, as a third image group, at least a part of images having relevance to images contained in the second image group from the first image group except the second image group based on a result of image analysis on images contained in the first image group.

Also, the present invention provides an image processing method including:

a step of acquiring an instruction input by a first user, with an instruction acquiring section;

a step of selecting, as a second image group, a part of images from a first image group owned by the first user based on the instruction, with an image group selecting section;

a step of carrying out image analysis on images contained in the first image group, with an image analyzer; and a step of extracting, as a third image group, at least a part of images having relevance to images contained in the second image group from the first image group except the second image group based on a result of image analysis on images contained in the first image group, with an image group extracting section.

Further, the present invention provides a computer readable recording medium having recorded thereon a program adapted to cause a computer to execute each step of the image processing method described above.

According to the invention, from a first image group of a large number of images of a first user that are merely stored in an online data storage but are not utilized, based on a second image group selected by the first user, images matching the first user's preference can be accurately extracted as a third image group. In addition, the third image group can be effectively utilized by the first user through recommendation of a way of utilization of the third image group to the first user.

DETAILED DESCRIPTION OF THE INVENTION

An image processing device, an image processing method and a recording medium of the invention are described below in detail with reference to preferred embodiments shown in the accompanying drawings.

Figure 1:
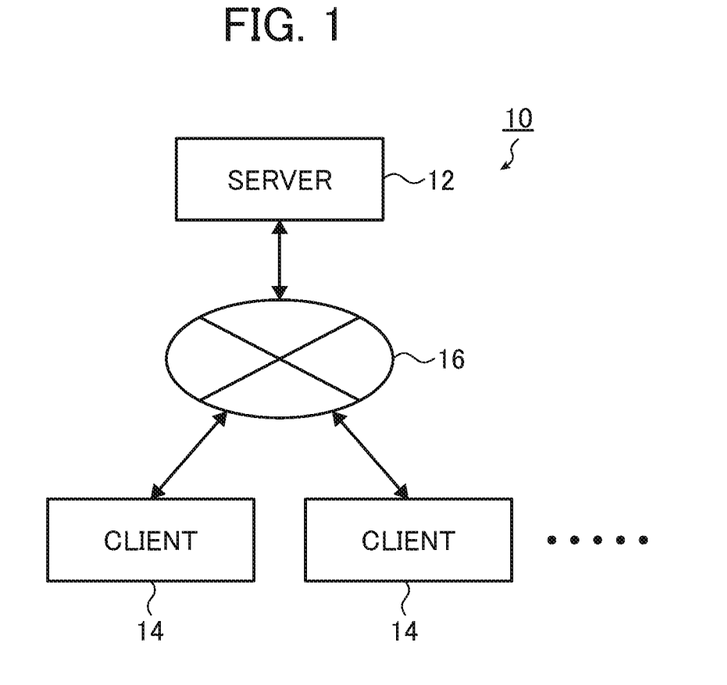
FIG. 1 is a block diagram showing an embodiment of the configuration of an image processing device of the invention.

FIG. 1 is a block diagram showing an embodiment of the configuration of an image processing device of the invention. The image processing device 10 illustrated in FIG. 1 includes a server 12 and two or more clients 14 connected to the server 12 via a network 16 such as the Internet. The image processing device 10 enables the images uploaded from the clients 14 of the respective users to the server 12 via the network 16 to be shared by users of other clients 14 via the network 16.

Figure 2:
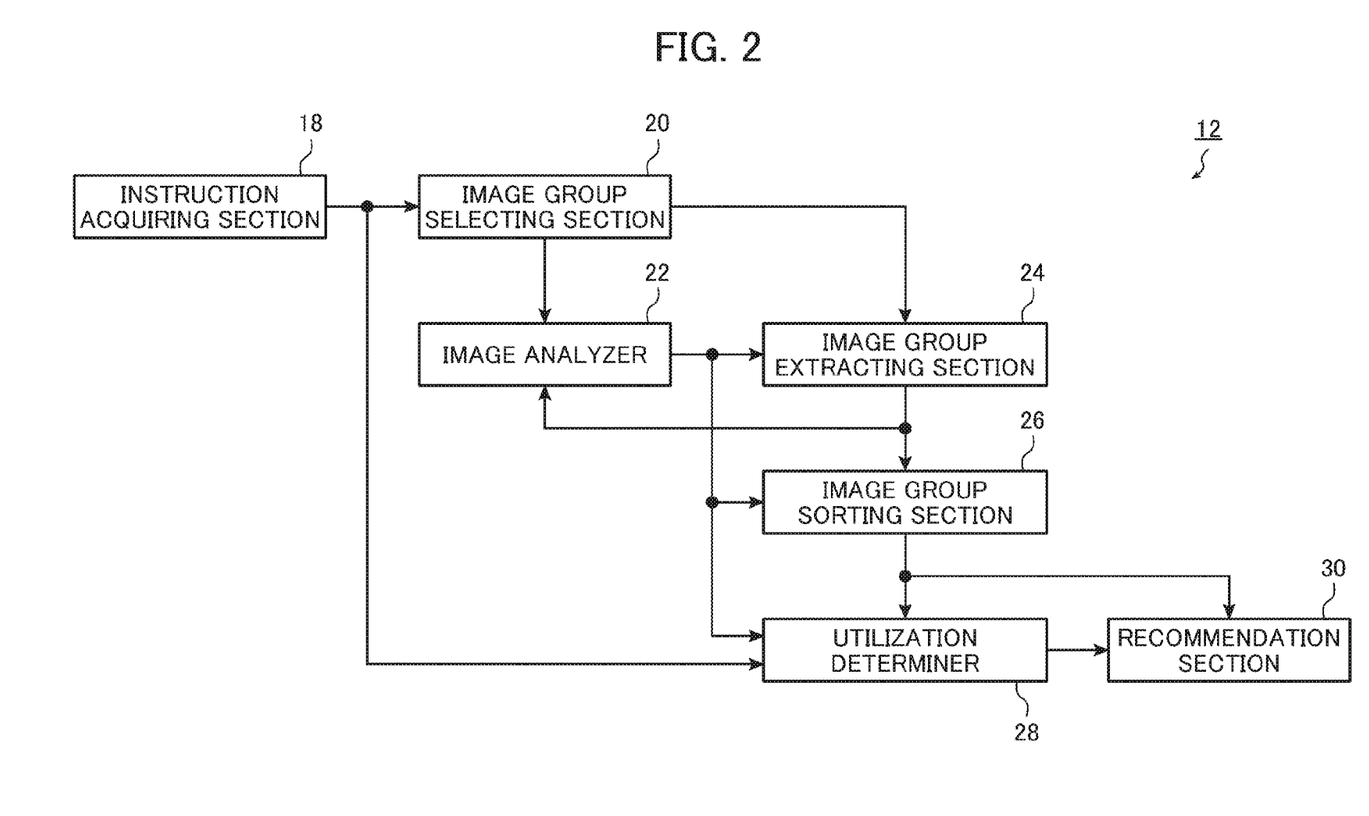
FIG. 2 is a block diagram showing an embodiment of the configuration of the server shown in FIG. 1.

FIG. 2 is a block diagram showing an embodiment of the configuration of the server shown in FIG. 1. The server 12 illustrated in FIG. 2 is an example of an online data storage that stores images uploaded from the respective users' clients 14, and provides a function for sharing the images with other users' clients 14. The server 12 includes an instruction acquiring section 18, an image group selecting section 20, an image analyzer 22, an image group extracting section 24, an image group sorting section 26, a utilization determiner 28 and a recommendation section 30.

In the server 12, the instruction acquiring section 18 acquires an instruction input by the first user.

The instruction acquiring section 18 acquires, via the network 16, various instructions input by the first user through the first user's client 14. The instructions by the first user include an instruction to select an image group and an instruction to designate a way of utilization of an image group.

Figure 3:
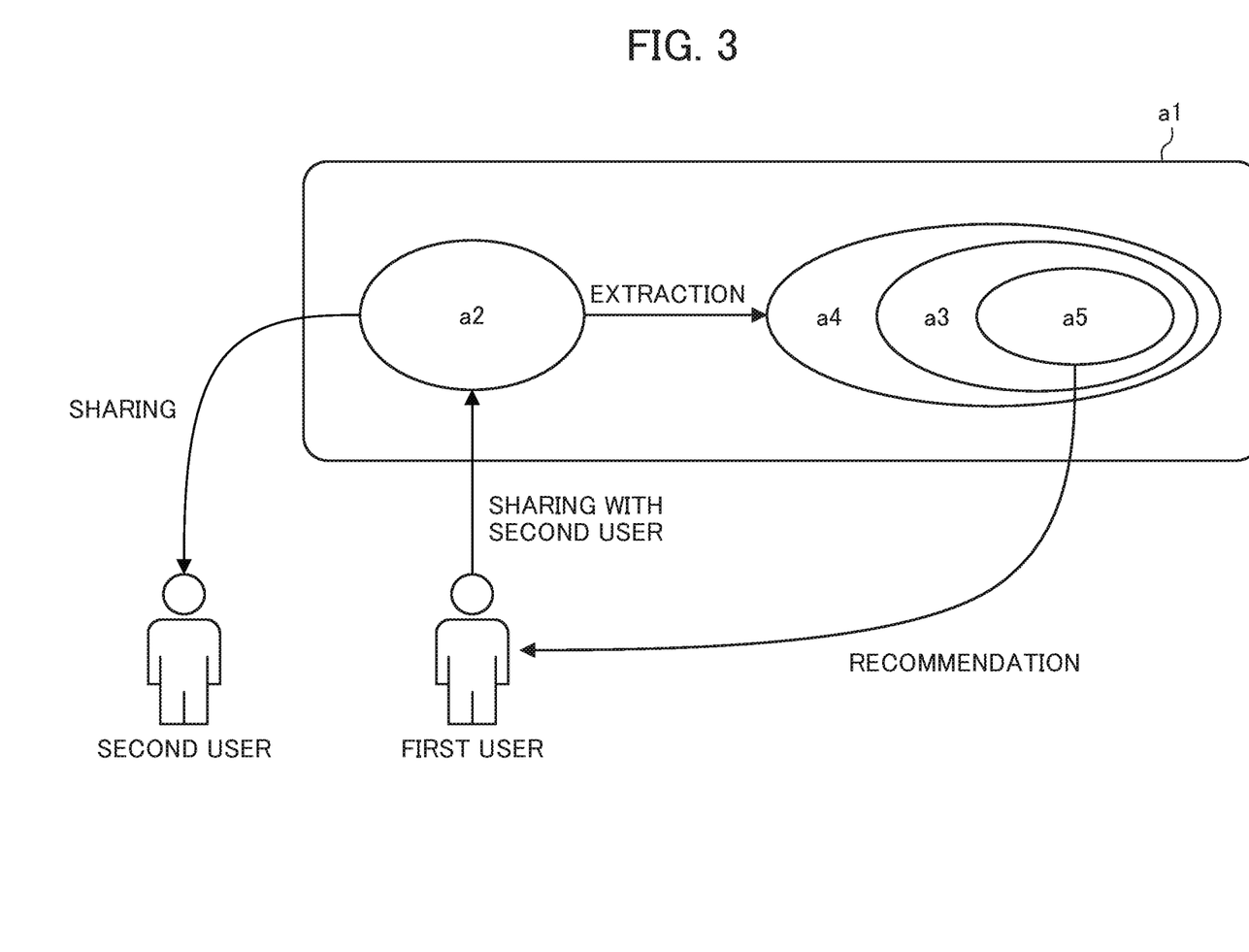
FIG. 3 is a conceptual diagram showing an embodiment of image groups owned by the first user.

The image group selecting section 20 selects, as a second image group a2, a part of images from a first image group a1 owned by the first user as illustrated in FIG. 3, based on the user's instruction acquired by the instruction acquiring section 18.

The first image group a1, for example, is an image group uploaded through the first user's client 14 to the server 12, while the second image group a2 is an image group selected from the first image group a1 according to the first user's instruction.

The image analyzer 22 carries out image analysis on images contained in the first image group a1.

The image analyzer 22 carries out a variety of image analyses including: acquisition of incidental information (meta-information) such as the capturing condition, capturing date and time, capturing location and tag information of an image contained in the first image group a1; calculation of evaluation values of images as to the image qualities including out-of-focus blur and motion blur of the image, lightness, and colors of the image; face detection processing to detect a face region in the image; face recognition processing to recognize a face of a person present in the image; scene detection processing to detect a scene (sunset, night view, or ocean, for example) of the image; subject detection processing to detect subjects (persons or objects like an animal, building, flower, cuisine) present in the image; and image characteristics detection processing to detect image characteristics (color distribution, shape, and image edge, for example).

The image group extracting section 24 extracts, as a third image group a3, at least a part of images having relevance to images contained in the second image group a2 from the first image group a1 except the second image group a2 as illustrated in FIG. 3, based on a result of image analysis on images contained in the first image group a1.

For example, the image analyzer 22 first carries out image analysis, e.g., acquisition of incidental information of images, on images contained in the first image group a1 based on a first judgment criterion. Accordingly, the image group extracting section 24 extracts, as a fourth image group a4, images having relevance of a value not smaller than a first threshold value to images contained in the second image group a2 from the first image group a1 except the second image group a2, based on a result of image analysis on images contained in the first image group a1, i.e., incidental information of the images.

The image analyzer 22 then carries out image analysis, e.g., image content analysis, on images contained in the second image group a2 and the fourth image group a4, based on a second judgment criterion that is higher than the first judgment criterion. Accordingly, the image group extracting section 24 can extract, as a third image group a3, images having relevance of a value not smaller than a second threshold value, that is higher than the first threshold value, to images contained in the second image group a2 from the fourth image group a4, based on a result of image analysis, i.e., image content analysis, on images contained in the second image group a2 and the fourth image group a4.

The first and second judgment criteria are for judgment of calculation amounts required by the image analyzer 22 to carry out image analysis. Having the calculation amount for image analysis based on the first judgment criterion being Ca and the calculation amount for image analysis based on the second judgment criterion being Cb, Ca<Cb is established. The first and second threshold values each represent a degree of relevance to the second image group a2. Having the first threshold value being Ta and the second threshold value being Tb, Ta<Tb is established.

When so many images are contained in the first image group a1, the subsequent processing would possibly take a long period of time. Hence, although it is not essential to extract the fourth image group a4 from the first image group a1 except the second image group a2, images having relevance to images contained in the second image group a2 are desirably extracted, as the fourth image group a4, from the first image group a1 except the second image group a2, thereby narrowing down the images to be subjected to processing. In this manner, images can be narrowed down from those less relevant to the second image group a2 to those more relevant to the second image group a2, thereby enabling to shorten the time required for the subsequent processing.

The image group sorting section 26 sorts out, as a fifth image group a5, at least a part of images having image qualities falling within a predetermined range from the third image group a3 as illustrated in FIG. 3, based on a result of image analysis on images contained in the third image group a3 that were extracted by the image group extracting section 24.

Although it is not essential to sort out the fifth image group a5 from the third image group a3, images having good image qualities can be sorted out by extracting the fifth image group a5 having image qualities such as out-of-focus and motion blurs, lightness and colors falling within the predetermined range from the third image group a3.

The utilization determiner 28 determines a way of utilization of the fifth image group a5 based on at least one of the instruction by the first user, the result of image analysis on images contained in the first image group a1 and a result of image analysis on images contained in the fifth image group a5.

Exemplary ways of utilization of the fifth image group a5 include sharing the fifth image group a5 with other users, viewing the fifth image group a5, ordering prints of the fifth image group a5 and creating a synthetic image for a photo book using the fifth image group a5.

For example, when a user places an instruction to print an image in which the second user is present, the sharing of the fifth image group a5 with the second user is determined as a way of utilization. When a third user is present in an image contained in the second image group a2 or the fifth image group a5, the sharing of the fifth image group a5 with the third user is determined as a way of utilization.

Lastly, the recommendation section 30 displays, on the client 14 of the first user, recommendation of utilization of the fifth image group a5 in response to the way of utilization of the fifth image group a5 determined by the utilization determiner 28 to the first user.

If the image group sorting section 26 does not sort out the fifth image group a5 from the third image group a3, the utilization determiner 28 and the recommendation section 30 perform processing on the third image group a3.

Clients 14 are terminal devices owned by users, such as personal computers, tablet computers and smartphones. Each client 14 includes an input unit such as a keyboard, a mouse or a touch panel, a display such as a liquid crystal display or a touch panel, and a controller that controls processing for causing the input unit to acquire instructions input by a user, processing for causing the display to display various types of information, and other processing.

The server 12 and each client 14 have transmitting and receiving sections therein for transmitting and receiving various types of data between each other via the network 16, and the server 12 further includes a storage for storing images, a controller for controlling, for example, sharing of images, and others. In this embodiment, the transmitting and receiving sections, the storage, the controller, and others are omitted for avoiding the complexity.

Referring to the flowchart shown in FIG. 4, described below is the operation of the image processing device 10 during the recommendation processing by a single user in which, based on an image group of a part of images selected from the image group owned by the first user, another image group owned by the first user is recommended to the first user.

In this embodiment, it is supposed that the first image group a1 owned by the first user has been uploaded to the server 12, and the incidental information has been acquired through image analysis on images contained in the first image group a1 by the image analyzer 22 based on the first judgment criterion.

First, an instruction to share the second image group a2 selected from the first image group a1 with the second user is input by the first user through the first user's client 14 (Step S1), and the sever 12 then causes the instruction acquiring section 18 to acquire the instruction input by the first user.

The image group selecting section 20 selects the second image group a2 from the first image group a1 based on the instruction from the user (Step S2).

The image analyzer 22 carries out image analysis, e.g., image content analysis, on images contained in the second image group a2 based on the second judgment criterion (Step S3).

The image group extracting section 24 extracts, as the fourth image group a4, images having relevance of a value not smaller than the first threshold value to images contained in the second image group a2 from the first image group a1 except the second image group a2, based on the result of image analysis on images contained in the second image group a2, e.g., the incidental information of images (Step S4).

The image analyzer 22 carries out image analysis, e.g., image content analysis, on images contained in the fourth image group a4 based on the second judgment criterion (Step S5).

The image group extracting section 24 extracts, as the third image group a3, at least a part of images having relevance of a value not smaller than the second threshold value to images contained in the second image group a2 from the fourth image group a4 based on the result of image analysis, e.g., the image content analysis, on images contained in the second image group a2 and the fourth image group a4 (Step S6).

The image group sorting section 26 sorts out, as the fifth image group a5, at least a part of images having image qualities falling within a predetermined range from the third image group a3 based on the result of image analysis, e.g., image content analysis, on images contained in the third image group a3 (Step S7).

As in this embodiment, the third image group a3 may be extracted from the fourth image group a4, and thereafter the fifth image group a5 may be sorted out from the third image group a3. Or, alternatively, the third image group a3 may be extracted from the fourth image group a4, and at the same the fifth image group a5 may be sorted out.

The utilization determiner 28 determines a way of utilization of the fifth image group a5 based on at least one of the instruction by the first user, the result of image analysis on images contained in the first image group a1 and a result of the image analysis on images contained in the fifth image group a5 (Step S8). For example, the sharing of the fifth image group a5 by the first user with the second user is determined as a way of utilization.

The recommendation section 30 displays, on the client 14 of the first user, recommendation of utilization of the fifth image group a5 in response to the way of utilization determined by the utilization determiner 28 to the first user (Step S9). For example, the fifth image group a5 is displayed, and additionally a message like "Share the images with the second user?" is displayed on the client 14 of the first user.

As described above, from the first image group a1 of a large number images of the first user that are merely stored in an online data storage but are not utilized, based on the second image group a2 selected by the first user, images matching the first user's preference can be accurately extracted as the fifth image group a5 with the image processing device 10. In addition, the fifth image group a5 can be efficiently utilized by the first user by recommending a way of utilization of the fifth image group a5 to the first user.

In this embodiment, triggered by the sharing of the second image group a2 by the first user with the second user, the fifth image group a5 is extracted from the first image group a1 except the second image group a2 based on the second image group a2. However, the invention is not limited thereto. That is, regardless of the purpose of utilization of the second image group a2 by the first user, triggered by the selecting of the second image group a2 by the first user, the fifth image group a5 may be extracted from the first image group a1 except the second image group a2 based on the second image group a2.

The first user may share all images contained in the recommended fifth image group a5 with the second user as they are, or may share the fifth image group a5 from which unnecessary images are excluded with the second user. In the latter case, the image group selecting section 20 can further select, from the fifth image group a5, an image group of images from which unnecessary images have been excluded, based on the user's instruction.

When different image groups are selected from the first image group a1 plural times based on the user's instructions, the image group selecting section 20 may select the different groups corresponding to plural instructions together, as a single second image group a2, from the first image group a1, instead of selecting the second image group a2 from the first image group a1 every time the user's instruction is acquired. Since the number of images contained in the second image group a2 is increased in this manner, an image closer to the first user's preference can be found, and the number of subsequent processing steps can be decreased, thereby enabling to reduce the processing load on the server 12.

The image analyzer 22 carries out image analysis on images contained in the first image group a1 at arbitrary timings.

The image analyzer 22 may carry out image analysis before the second image group a2 is selected from the first image group a1, e.g., immediately after the first image group a1 is uploaded to the server 12 through the client 14. In this manner, the processing time after the second image group a2 is selected from the first image group a1 can be shortened. For instance, the first user may instruct to share the second image group a2, and then immediately recommendation processing can be performed. Alternatively, after the second image group a2 is selected from the first image group a1, e.g., after the second image group a2 is shared, image analysis may be carried out.

In order to meet the convenience of the server 12 that controls the image groups of the user, image analysis is desirably carried out in a predetermined time range, e.g., at midnight when the server 12 receives less accesses from the clients 14 and is thus abundant in its resources.

As in this embodiment described above, when the image analyzer 22 acquires incidental information of images contained in the first image group a1 as the image analysis, the image group extracting section 24 can extract the fourth image group a4 from the first image group a1 except the second image group a2 based on the incidental information of images.

When the image analyzer 22 acquires information on capturing dates and times of images contained in the first image group a1 as the incidental information, the image group extracting section 24 can extract the fourth image group a4 from the first image group a1 except the second image group a2 based on the information on capturing dates and times of images.

In this manner, images captured in a predetermined period of time prior to a start date of capturing of images contained in the second image group a2, e.g., images captured within a year preceding the start date of the capturing can be extracted, as the fourth image group a4, from the first image group a1 except the second image group a2.

In addition, a predetermined number of images captured before and after a capturing period of the second image group a2, e.g., each 100 images captured before and after the capturing period can be extracted, as the fourth image group a4, from the first image group a1 except the second image group a2.

In addition, images having the same capturing dates and times as those of images contained in the second image group a2 and captured in certain years within a predetermined period prior to the capturing dates and times of images contained in the second image group a2, e.g., images captured within the past 10 years in and on the same months and dates as those of the capturing dates and times of images contained in the second image group a2 can be extracted, as the fourth image group a4, from the first image group a1 except the second image group a2. Here, it is assumed to extract images captured in a yearly event such as a birthday, wedding anniversary, or a sports day.

In addition, when the image analyzer 22 acquires information on capturing locations of images contained in the first image group a1 as the incidental information, the image group extracting section 24 can extract the fourth image group a4 from the first image group a1 except the second image group a2 based on the information on capturing locations of images.

The server 12 that enables sharing of images has a classification function of assigning tag information to images, and assembling images into an album to maintain it based on the tag information. When the image analyzer 22 acquires tag information on images contained in the first image group a1 as the incidental information, the image group extracting section 24 extracts, as the fourth image group a4, images having tag information same as or similar to the tag information on images contained in the second image group a2 from the first image group a1 except the second image group a2.

For example, when the second image group a2 is tagged as "travel" by the user, the image group extracting section 24 can extract, as the fourth image group a4, images tagged as "travel" from the first image group a1 except the second image group a2. When the second image group a2 is tagged as "animal" through image recognition processing, the image group extracting section 24 can extract, as the fourth image group a4, images tagged as "animal" from the first image group a1 except the second image group a2.

When the image analyzer 22 acquires tag information on images contained in the first image group a1 as the incidental information and calculates evaluation values of the tag information, the image group extracting section 24 extracts, as the fourth image group a4, images with evaluation values of tag information falling within a predetermined range around the evaluation values of the tag information on images contained in the second image group a2 from the first image group a1 except the second image group a2 based on the tag information.

The image group extracting section 24 can divide the first image group a1 except the second image group a2 into a plurality of sixth image groups a6, assign priority rankings to the respective sixth image groups a6, and extract, as the fourth image group a4, images starting from the sixth image group a6 with the highest priority ranking to the sixth image group a6 with the lowest priority ranking. In this case, extraction is terminated when the number of images extracted from the sixth image groups a6 reaches a predetermined number.

For example, among the first image group a1 except the second image group a2, the sixth image groups a6 captured in one month preceding the start date of capturing of the second image group a2, captured in a period starting from three months to one month prior to the start date of capturing of the second image group a2, and captured in a period starting from a year to three months prior to the start date of capturing of the second image group a2 are assigned priority rankings A, B and C in descending order of priority. In this manner, images are extracted from the sixth image group a6 of the priority ranking A, the sixth image group a6 of the priority ranking B and the sixth image group a6 of the priority ranking C in this order, and image extraction is terminated when the number of images extracted from the sixth image groups a6 of the priority rankings A, B and C reaches a predetermined number.

In addition to the second image group a2, the third image group a3 may be extracted from the fourth image group a4, based on one or more past second image groups a2 that were selected before the second image group a2. If, as described above, in addition to the latest second image group a2, the second image groups a2 selected in the past are incorporated in the judgment criterion for extracting the third image group a3 from the fourth image group a4, the judgment criterion can be more optimized for the first user every time the second image group a2 is selected, whereby an image closer to the first user's preference can be found.

When the image analyzer 22 acquires information on capturing dates and times of images contained in the second image group a2 and the fourth image group a4 as the incidental information, the image group extracting section 24 can extract, as the third image group a3, images captured in predetermined periods before and after capturing dates and times of images contained in the second image group a2 from the fourth image group a4 based on the information on capturing dates and times. For instance, images captured on and at capturing dates and times close to capturing dates and times of images contained in the second image group a2 are extracted.

When the image analyzer 22 acquires information on capturing locations of images contained in the second image group a2 and the fourth image group a4 as the incidental information, the image group extracting section 24 can extract, as the third image group a3, images captured in a predetermined area around the capturing locations of images contained in the second image group a2 from the fourth image group a4 based on the information on capturing locations. For instance, images captured at locations near the capturing locations of images contained in the second image group a2 are extracted.

When the image analyzer 22 carries out scene detection processing for detecting scenes of images contained in the second image group a2 and the fourth image group a4 as the image analysis, the image group extracting section 24 can extract, as the third image group a3, images of scenes similar to scenes of images contained in the second image group a2 from the fourth image group a4 based on the detected scenes of images. For instance, if ocean scenes are often found in the second image group a2, images of ocean scenes are extracted from the fourth image group a4 as the third image group a3.

When the image analyzer 22 carries out image characteristics detection processing for detecting image characteristics of images contained in the second image group a2 and the fourth image group a4 as the image analysis, the image group extracting section 24 can extract, as the third image group a3, images having image characteristics similar to those of images contained in the second image group a2 from the fourth image group a4 based on the detected image characteristics. For instance, images having similar color distributions, shapes, edges and the like as the image characteristics are extracted from the fourth image group a4 as the third image group a3.

When the image analyzer 22 carries out subject detection processing for detecting subjects present in images contained in the second image group a2 and the fourth image group a4 as the image analysis, the image group extracting section 24 can extract, as the third image group a3, images including subjects similar to those present in images contained in the second image group a2 from the fourth image group a4 based on the detected subjects. For instance, images including same persons as those present in images contained in the second image group a2 or images including same animals, same buildings, same flowers, same cuisines or the like as those present in images contained in the second image group a2 are extracted from the fourth image group a4 as the third image group a3.

When the image group extracting section 24 extracts the fourth image group a4 from the first image group a1 except the second image group a2 in order to extract the third image group a3 to be utilized between the first user's client 14 and the second user's client 14 from the fourth image group a4, the fourth image group a4 is desirably extracted from the first image group a1 except the second image group a2, excluding the images previously used between the first user's client 14 and the second user's client 14. In this manner, images that have never been used between the first user's client 14 and the second user's client 14 can be extracted, as the fourth image group a4, from the first image group a1 except the second image group a2.

On the other hand, when the fourth image group a4 is extracted from the first image group a1 except the second image group a2 in order to extract the third image group a3 to be utilized between the first user's client 14 and the third user's client 14, the third user being different from the second user, and when the above-described images that are excluded from the first image group a1 except the second image group a2 have not been utilized yet between the first user's client 14 and the third user's client 14, the fourth image group a4 can be extracted from the first image group a1 except the second image group a2 including the excluded images.

Since, among the first image group a1 except the second image group a2, images having undergone the image analysis do not require long time for the subsequent processing, the images may be extracted as the fourth image group a4 without any limitation.

Among the first image group a1 except the second image group a2, based on the result of image analysis on the images that have undergone the image analysis, the fourth image group a4 may be extracted from the first image group a1 except the second image group a2.

Based on, in addition to the latest second image group a2, one or more previous second image groups a2 that were selected before the latest second image group a2, the fourth image group a4 may be extracted from the first image group a1 except the second image group a2.

When the previous third image group a3 was used by the first user's client 14, the image analyzer 22 and the image group extracting section 24 may treat the previous third image group a3 as the second image group a2, carry out the same processing carried out based on the previous second image group a2 on the previous third image group a3 to extract the third image group a3.

In this case, reusing the outcome of the processing carried out based on the previous second image group a2, the same processing carried out based on the previous second image group a2 may be carried out on the previous third image group a3 to extract the third image group a3. For instance, the previous fourth image group a4 that was the basis of the previous third image group a3 can be excluded from the fourth image group a4, and since the images contained in the previous fourth image group a4 that was the basis of the previous third image group a3 have undergone the image analysis, information of such image analysis can be used to extract the fourth image group a4 from the first image group a1 except the second image group a2. In this manner, the processing time for extracting the third image group a3 can be shortened.

When image qualities of all images contained in the third image group a3 fall within a predetermined range, the image group sorting section 26 may sort out, as the fifth image group a5, all images contained in the third image group a3 from the third image group a3. That is, the third image group a3 may be directly output as the fifth image group a5 without sorting out of images.

When the image analyzer 22 calculated evaluation values as to the image qualities such as out-of-focus or motion blur, lightness, colors and the like of images contained in the third image group a3 based on the result of image analysis on images contained in the third image group a3, the image group sorting section 26 may sort out, as the fifth image group a5, images having high evaluation values (not smaller than a threshold value) from the third image group a3 based on the calculated evaluation values of images.

In this manner, for example, a predetermined number of images starting from the image having the highest evaluation value to the image having the lowest evaluation value in order may be sorted out, as the fifth image group a5, from the third image group a3, or a predetermined proportion of images starting from the image having the highest evaluation value to the image having the lowest evaluation value in order may be sorted out, as the fifth image group a5, from the third image group a3.

The recommendation section 30 recommends utilization of the fifth image group a5 to the first user after the first user shared the second image group a2 with the second user at an arbitrary timing. For instance, the recommendation section 30 may recommend a way of utilization of the fifth image group a5 immediately after the way of utilization is determined, or may present a display recommending the way of utilization of the fifth image group a5 when a predetermined period of time has elapsed after determination of the way of utilization of the fifth image group a5.

In addition, not only recommendation processing by a single user, but also recommendation processing by plural users can be performed to recommend to the second user a part of images of the image group owned by the second user, based on a part of images selected from the image group owned by the first user.

Figure 5:
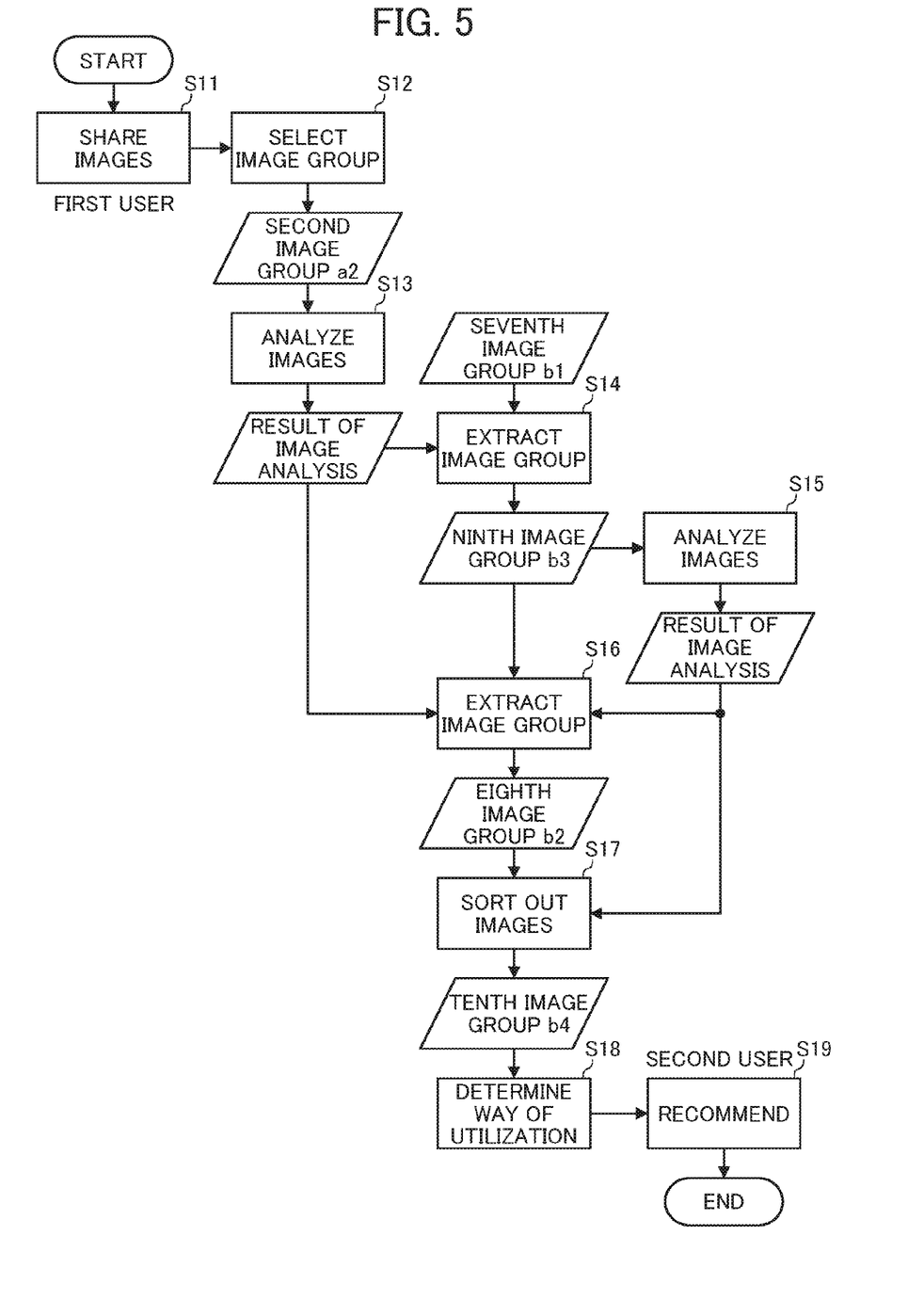
FIG. 5 is a flowchart of an embodiment showing the operation of the image processing device to perform recommendation processing performed by plural users.

Next, the operation of the image processing device 10 during the recommendation processing by plural users is described with reference to the flowchart shown in FIG. 5.

Figure 6:
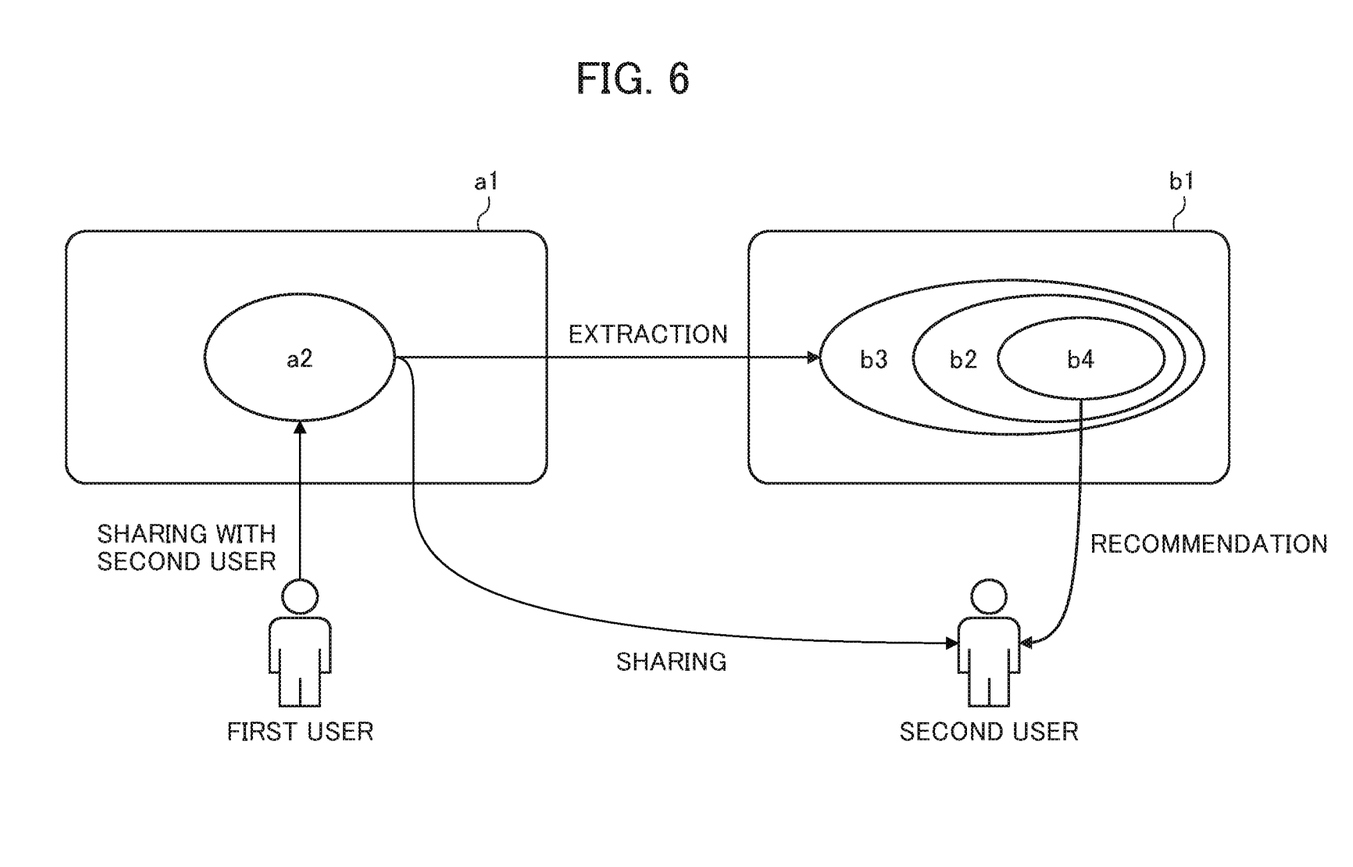
FIG. 6 is a conceptual diagram showing an embodiment of image groups owned by the first user and the second user.

Comparing to the recommendation processing by a single user, the recommendation processing by plural users is similar to the recommendation processing by a single user, while a seventh image group b1 owned by the second user correspond to the first image group a1 except the second image group a2, and an eighth image group b2, a ninth image group b3 and a tenth image group b4 respectively correspond to the third image group a3, the fourth image group a4 and the fifth image group a5, as illustrated in FIG. 6.

Similarly, supposedly, the first image group a1 and the seventh image group b1 have been uploaded to the server 12, and the incidental information has been acquired through image analysis on images contained in the first image group a1 and the seventh image group b1 by the image analyzer 22 based on the first judgment criterion.

Figure 4:
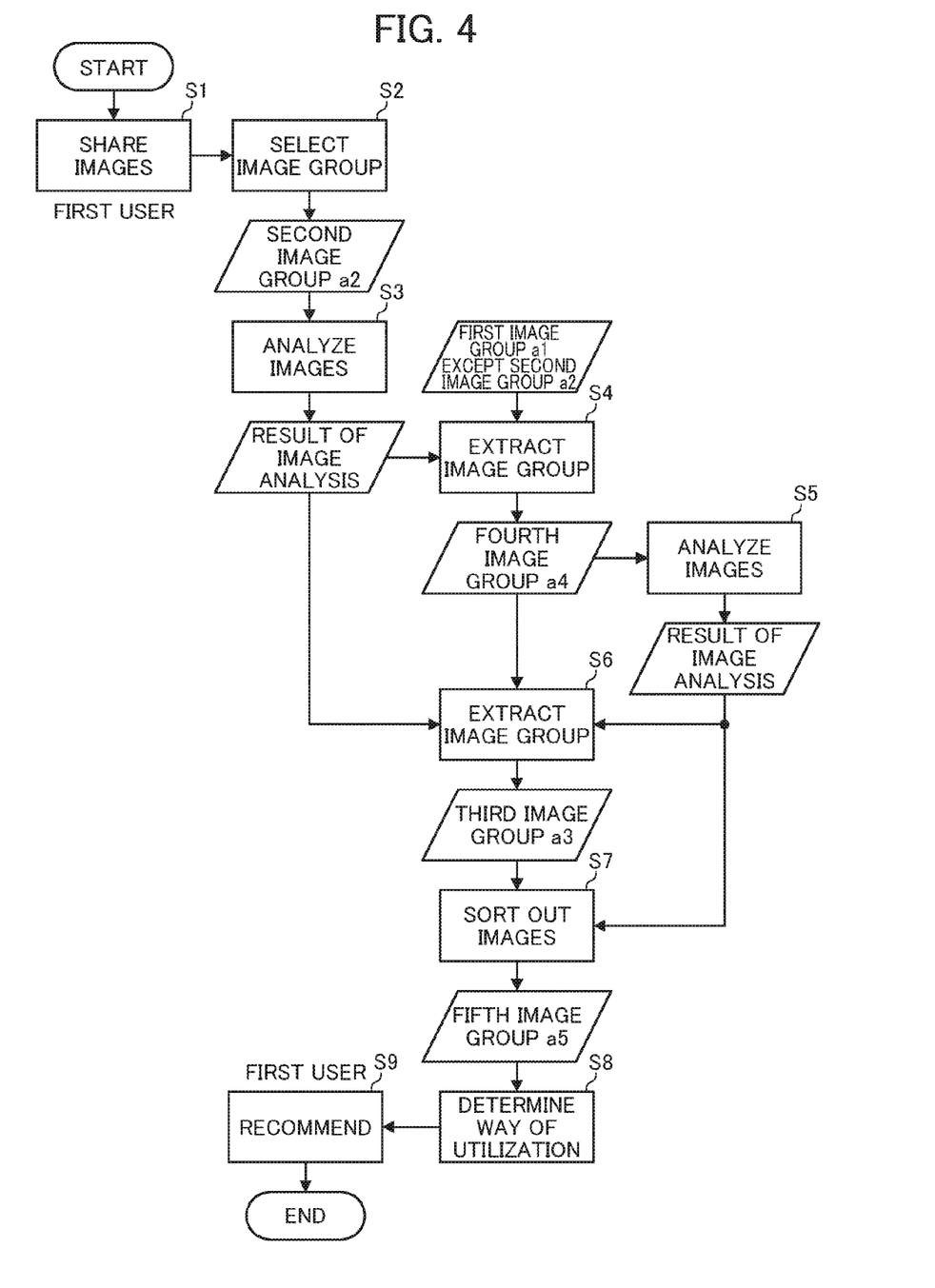
FIG. 4 is a flowchart of an embodiment showing the operation of the image processing device to carry out recommendation processing performed by a single user.

The operations of Steps S11 to S13 are same as those of Steps S1 to S3 illustrated in FIG. 4. That is, the instruction acquiring section 18 acquires an instruction input by the first user (Step S11), the image group selecting section 20 selects the second image group a2 from the first image group a1 based on the user's instruction (Step S12), and the image analyzer 22 carries out image analysis such as image content analysis, on images contained in the second image group a2 (Step S13).

The image group extracting section 24 extracts, as the ninth image group b3, images having relevance of a value not smaller than the first threshold value to images contained in the second image group a2 from the seventh image group b1, based on the result of image analysis, e.g., the incidental information of images, on images contained in the second image group a2 (Step S14).

The image analyzer 22 carries out image analysis, e.g., image content analysis, on images contained in the ninth image group b3 based on the second judgment criterion (Step S15).

The image group extracting section 24 extracts, as the eighth image group b2, at least a part of images having relevance of a value not smaller than the second threshold value to images contained in the second image group a2 from the ninth image group b3 based on the result of image analysis, e.g., the image content analysis, on images contained in the second image group a2 and the ninth image group b3 (Step S16).

The image group sorting section 26 sorts out, as the tenth image group b4, at least a part of images having image qualities falling within a predetermined range from the eighth image group b2 based on the result of image analysis, e.g., image content analysis, on images contained in the eighth image group b2 (Step S17).

As in this embodiment, the eighth image group b2 may be extracted from the ninth image group b3, and thereafter the tenth image group b4 may be sorted out from the eighth image group b2. Or, alternatively, the eighth image group b2 may be extracted from the ninth image group b3, and at the same time, the tenth image group b4 may be sorted out.

The utilization determiner 28 determines a way of utilization of the tenth image group b4 based on at least one of the instruction by the first user, the result of image analysis on images contained in the first image group a1 and a result of the image analysis on images contained in the tenth image group b4 (Step S18). For example, the sharing of the tenth image group b4 by the second user with the first user is determined as a way of utilization.

The recommendation section 30 displays, on the client 14 of the second user, recommendation of the tenth image group b4 in response to the way of utilization determined by the utilization determiner 28 to the second user (Step S19). For example, the tenth image group b4 is displayed, and additionally a message like "Share the images with the first user?" is displayed on the client 14 of the second user.

As described above, from the seventh image group b1 of a large number of images of the second user that are merely stored in an online data storage but are not utilized, based on the second image group a2 selected by the first user, images matching the first user's preference can be automatically extracted with the image processing device 10. In addition, the tenth image group b4 can be efficiently utilized by the second user by recommending a way of utilization of the tenth image group b4 to the second user.

If the image group sorting section 26 does not sort out the tenth image group b4 from the eighth image group b2, the utilization determiner 28 and the recommendation section 30 perform processing on the eighth image group b2.

Figure 7:
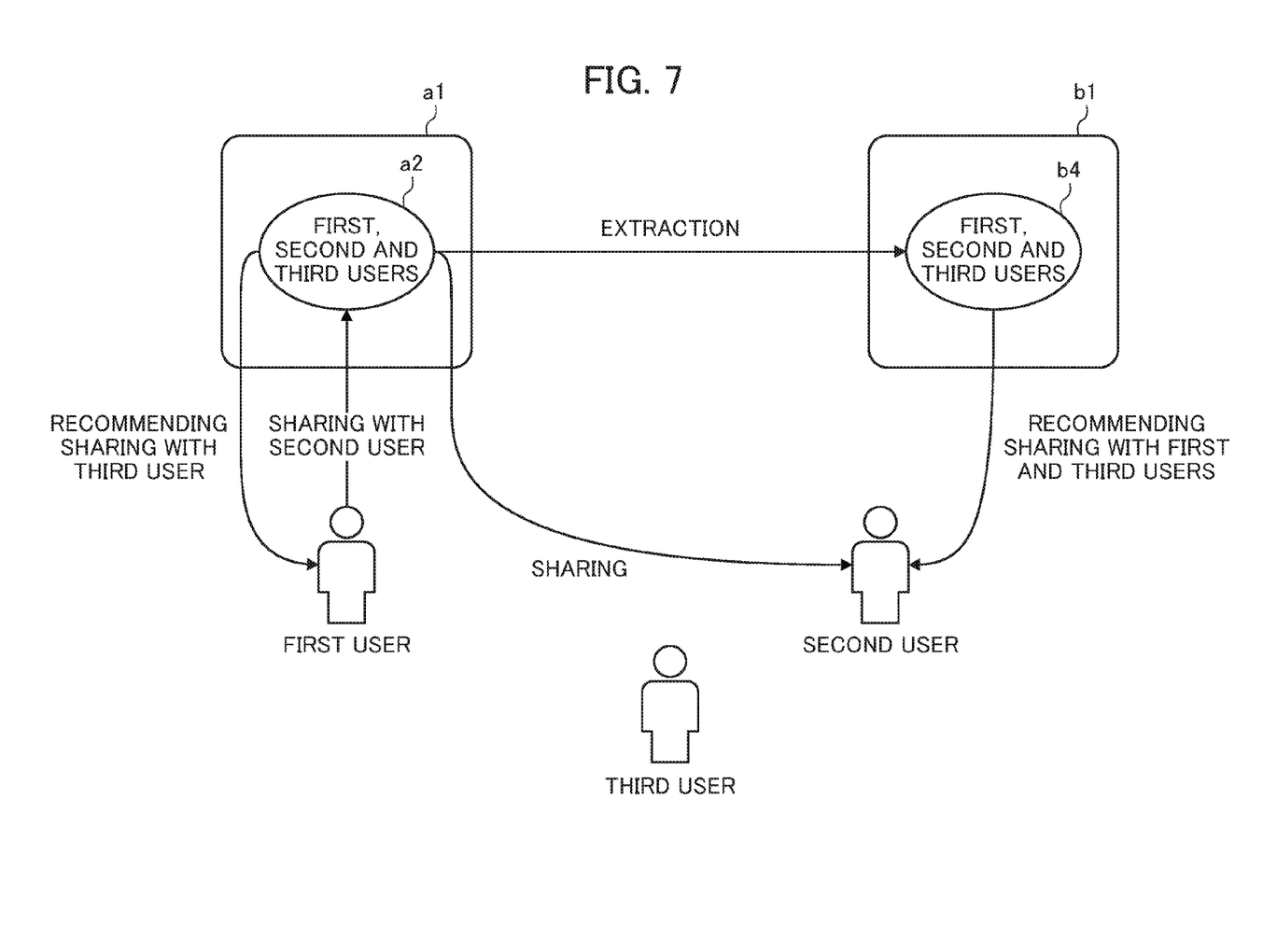
FIG. 7 is a conceptual diagram showing an embodiment of image groups owned by the first user and the second user, the image groups including images in which the third user is present.

As illustrated in FIG. 7, when there is a third user other than the first and second users in images contained in the second image group a2 and images contained in the tenth image group b4 whose utilization is recommended to the second user, the recommendation section 30 may further present, on the first and second users' clients 14, a display recommending to the first and second users utilization of the second image group a2 and the tenth image group b4 for the third user. In this manner, an opportunity to share images with the third user, with whom images are not directly shared, can be created, for example.

In addition, after the first user shares the second image group a2 with the second user, the second image group a2 is supposed to be taken into the seventh image group b1 by the second user. However, since the second image group a2 taken into the seventh image group b1 is originally owned by the first user, the tenth image group b4 is preferably extracted from the seventh image group b1, with the second image group a2 taken into the seventh image group b1 being excluded. In this manner, even when the second image group a2 is taken into the seventh image group b1 by the second user, images not owned by the first user can be extracted from the seventh image group b1 as the tenth image group b4.

While described above is the case in which triggered by the first user's sharing of images with the second user, a part of images are extracted from the image group owned by the second user and recommended to the second user, similarly, triggered by the second user's sharing of images with the first user, a part of images may be extracted from the image group owned by the first user and recommended to the first user.

While described is the image processing device 10 having the server 12 and two or more clients 14 each connected to the server 12 via the network 16, the invention is not limited thereto. The image processing device of the invention may be configured as a function the server 12 has as in this embodiment or, alternatively, for instance, as a function each client 14 has. In addition, two or more clients 14 may be directly connected to each other via a network 16, without necessity of a sever 12.

While an image group previously uploaded in the server 12 is used as the first image group a1 in the above embodiment, the invention is not limited thereto. For instance, having the first user's allowance or the like, among the first image group a1, an image group previously uploaded in the server 12 may be used as the second image group a2, and an image group stored in the first user's client 14 may be used as the first image group a1 except the second image group a2. Alternatively, an image group previously uploaded in the server 12 may be used as the second image group a2, images previously uploaded in the server 12 may be used as a part of images of the first image group a1 except the second image group 2a, and the images stored in the first user's client 14 may be used as other images of the first image group a1 except the second image group a2. The same applies to the case of the seventh image group b1.

The device of the invention may be composed of constituent elements that are dedicated hardware devices or composed of a computer in which operations of the constituent elements are programmed.

The method of the invention can be carried out by, for instance, a program that causes a computer to implement steps of the method. A computer readable recording medium having the program recorded thereon may also be provided.

While the invention has been described above in detail, the invention is not limited to the above embodiment, and various improvements and modifications may be made without departing from the spirit and scope of the invention.

What is claimed is:

1. An image processing device comprising:
   an instruction acquiring section configured to acquire an instruction input by a first user;
   an image group selecting section configured to select, as a second image group, a part of images from a first image group owned by the first user based on the instruction;
   an image analyzer configured to carry out image analysis on images contained in the first image group based on a first judgment criterion; and
   an image group extracting section configured to extract, as a third image group, at least a part of images having relevance to images contained in the second image group from the first image group except the second image group based on a result of image analysis on images contained in the first image group,
   wherein the image group extracting section extracts, as a fourth image group, images having relevance of a value not smaller than a first threshold value to images contained in the second image group from the first image group except the second image group based on a result of image analysis on images contained in the first image group,
   the image analyzer further carries out image analysis on images contained in the second image group and the fourth image group based on a second judgment criterion that is higher than the first judgment criterion, and
   the image group extracting section extracts, as the third image group, images having relevance of a value not smaller than a second threshold value that is higher than the first threshold value to images contained in the second image group from the fourth image group based on a result of image analysis on images contained in the second image group and the fourth image group.

2. The image processing device according to claim 1, further comprising:
   a utilization determiner configured to determine a way of utilization of the third image group based on at least one of the instruction, the result of image analysis on images contained in the first image group and a result of image analysis on images contained in the third image group; and
   a recommendation section configured to present on a terminal device of the first user a display recommending utilization of the third image group in accordance with the way of utilization to the first user.

3. The image processing device according to claim 1,
   wherein the image analyzer acquires incidental information of images contained in the first image group as the image analysis, and the image group extracting section extracts the fourth image group from the first image group except the second image group based on the incidental information.

4. The image processing device according to claim 3, wherein the image analyzer acquires information on capturing dates and times of images contained in the first image group as the incidental information, and
the image group extracting section extracts the fourth image group from the first image group except the second image group based on the information on capturing dates and times.

5. The image processing device according to claim 3, wherein the image analyzer acquires information on capturing locations of images contained in the first image group as the incidental information, and
the image group extracting section extracts the fourth image group from the first image group except the second image group based on the information on capturing locations.

6. The image processing device according to claim 3, wherein the image analyzer acquires tag information of images contained in the first image group as the incidental information, and
the image group extracting section further extracts, as the fourth image group, images having tag information same as or similar to tag information of images contained in the second image group from the first image group except the second image group based on the tag information.

7. The image processing device according to claim 3, wherein the image analyzer acquires tag information of images contained in the first image group as the incidental information and calculates evaluation values of the tag information, and
the image group extracting section further extracts, as the fourth image group, images having evaluation values of tag information falling within a predetermined range around evaluation values of tag information of images contained in the second image group from the first image group except the second image group based on the tag information.

8. The image processing device according to claim 3, wherein the image analyzer acquires information on capturing dates and times of images contained in the second image group and the fourth image group as the incidental information, and
the image group extracting section extracts, as the third image group, images captured within a predetermined period of time before and after capturing dates and times of images contained in the second image group from the fourth image group based on the information on capturing dates and times.

9. The image processing device according to claim 3, wherein the image analyzer acquires information on capturing locations of images contained in the second image group and the fourth image group as the incidental information, and
the image group extracting section extracts, as the third image group, images captured at locations in a predetermined area around the capturing locations of images contained in the second image group from the fourth image group based on the information on capturing locations.

10. The image processing device according to claim 1, wherein the image analyzer carries out scene detection processing for detecting scenes of images contained in the second image group and the fourth image group as the image analysis, and
the image group extracting section extracts, as the third image group, images including similar scenes to scenes of images contained in the second image group from the fourth image group based on the scenes.

11. The image processing device according to claim 1, wherein the image analyzer carries out image characteristics detection processing for detecting image characteristics of images contained in the second image group and the fourth image group as the image analysis, and
the image group extracting section extracts, as the third image group, images having image characteristics similar to image characteristics of images contained in the second image group from the fourth image group based on the image characteristics.

12. The image processing device according to claim 1, wherein the image analyzer carries out subject detection processing for detecting subjects present in images contained in the second image group and the fourth image group as the image analysis, and
the image group extracting section extracts, as the third image group, images including subjects similar to subjects present in images contained in the second image group from the fourth image group based on the subjects.

13. The image processing device according to claim 2, further comprising an image group sorting section configured to sort out, as a fifth image group, at least a part of images having image qualities falling within a predetermined range from the third image group based on a result of image analysis on images contained in the third image group,
wherein the utilization determiner determines a way of utilization of the fifth image group based on at least one of the instruction, the result of image analysis on images contained in the first image group and a result of image analysis on images contained in the fifth image group, and
the recommendation section presents on the terminal device of the first user a display recommending utilization of the fifth image group in accordance with the way of utilization to the first user.

14. The image processing device according to claim 13, wherein the image analyzer calculates evaluation values of images contained in the third image group based on a result of image analysis on images contained in the third image group, and
the image group sorting section sorts out, as the fifth image group, images having evaluation values not smaller than a threshold value from the third image group based on the evaluation values.

15. The image processing device according to claim 14, wherein the image group sorting section sorts out, as the fifth image group, a predetermined number of images starting from an image having a highest evaluation value to an image having a lowest evaluation value in order from the third image group.

16. The image processing device according to claim 14, wherein the image group sorting section sorts out, as the fifth image group, a predetermined proportion of images starting from an image having a highest evaluation value to an image having a lowest evaluation value in order from the third image group.

17. The image processing device according to claim 2,
wherein the image analyzer further carries out image analysis on images contained in a seventh image group owned by a second user,
the image group extracting section further extracts, as an eighth image group, at least a part of images having relevance to images contained in the second image group from the seventh image group based on a result of image analysis on images contained in the second image group and the seventh image group,
the utilization determiner further determines a way of utilization of the eighth image group based on at least one of the instruction, the result of image analysis on images contained in the first image group, and the eighth image group, and
the recommendation section further presents on a terminal device of the second user a display recommending utilization of the eighth image group in accordance with the way of utilization to the second user.

18. An image processing method comprising:
a step of acquiring an instruction input by a first user, with an instruction acquiring section;
a step of selecting, as a second image group, a part of images from a first image group owned by the first user based on the instruction, with an image group selecting section;
a step of carrying out image analysis on images contained in the first image group based on a first judgment criterion, with an image analyzer;
a step of extracting, as a third image group, at least a part of images having relevance to images contained in the second image group from the first image group except the second image group based on a result of image analysis on images contained in the first image group, with an image group extracting section;
a step of extracting, as a fourth image group, images having relevance of a value not smaller than a first threshold value to images contained in the second image group from the first image group except the second image group based on a result of image analysis on images contained in the first image group, with the image group extracting section;
a step of carrying out image analysis on images contained in the second image group and the fourth image group based on a second judgment criterion that is higher than the first judgment criterion, with the image analyzer; and
a step of extracting, as the third image group, images having relevance of a value not smaller than a second threshold value that is higher than the first threshold value to images contained in the second image group from the fourth image group based on a result of image analysis on images contained in the second image group and the fourth image group, with the image group extracting section.

19. A non-transitory computer readable recording medium having recorded thereon a program for causing a computer to execute each step of the image processing method according to claim 18.

20. An image processing device comprising a computer, wherein the computer comprises:
an instruction acquiring processor that acquires an instruction input by a first user;
an image group selecting processor that selects, as a second image group, a part of images from a first image group owned by the first user based on the instruction;
an image analyzing processor that carries out image analysis on images contained in the first image group based on a first judgment criterion; and
an image group extracting processor that extracts, as a third image group, at least a part of images having relevance to images contained in the second image group from the first image group except the second image group based on a result of image analysis on images contained in the first image group,
wherein the image group extracting processor extracts, as a fourth image group, images having relevance of a value not smaller than a first threshold value to images contained in the second image group from the first image group except the second image group based on a result of image analysis on images contained in the first image group,
the image analyzing processor further carries out image analysis on images contained in the second image group and the fourth image group based on a second judgment criterion that is higher than the first judgment criterion, and
the image group extracting processor extracts, as the third image group, images having relevance of a value not smaller than a second threshold value that is higher than the first threshold value to images contained in the second image group from the fourth image group based on a result of image analysis on images contained in the second image group and the fourth image group.

21. An image processing method comprising:
acquiring an instruction input by a first user, with an instruction acquiring processor of a computer;
selecting, as a second image group, a part of images from a first image group owned by the first user based on the instruction, with an image group selecting processor of the computer;
carrying out image analysis on images contained in the first image group based on a first judgment criterion, with an image analyzing processor of the computer;
extracting, as a third image group, at least a part of images having relevance to images contained in the second image group from the first image group except the second image group based on a result of image analysis on images contained in the first image group, with an image group extracting processor of the computer;
extracting, as a fourth image group, images having relevance of a value not smaller than a first threshold value to images contained in the second image group from the first image group except the second image group based on a result of image analysis on images contained in the first image group, with the image group extracting processor;
carrying out image analysis on images contained in the second image group and the fourth image group based on a second judgment criterion that is higher than the first judgment criterion, with the image analyzing processor; and
extracting, as the third image group, images having relevance of a value not smaller than a second threshold value that is higher than the first threshold value to images contained in the second image group from the fourth image group based on a result of image analysis on images contained in the second image group and the fourth image group, with the image group extracting processor.

22. An image processing device comprising:
an instruction acquiring section configured to acquire an instruction input by a first user;

an image group selecting section configured to select, as a second image group, a part of images from a first image group owned by the first user based on the instruction;

an image analyzer configured to carry out image analysis on images contained in the first image group;

an image group extracting section configured to extract, as a third image group, at least a part of images having relevance to images contained in the second image group from the first image group except the second image group based on a result of image analysis on images contained in the first image group;

a utilization determiner configured to determine a way of utilization of the third image group based on at least one of the instruction, the result of image analysis on images contained in the first image group and a result of image analysis on images contained in the third image group; and a recommendation section configured to present on a terminal device of the first user a display recommending utilization of the third image group in accordance with the way of utilization to the first user, wherein the way of utilization of the third image group includes at least one of sharing the third image group with other users, ordering prints of the third image group, and creating a synthetic image using the third image group.

23. An image processing method comprising:

a step of acquiring an instruction input by a first user, with an instruction acquiring section;

a step of selecting, as a second image group, a part of images from a first image group owned by the first user based on the instruction, with an image group selecting section;

a step of carrying out image analysis on images contained in the first image group, with an image analyzer;

a step of extracting, as a third image group, at least a part of images having relevance to images contained in the second image group from the first image group except the second image group based on a result of image analysis on images contained in the first image group, with an image group extracting section;

a step of determining a way of utilization of the third image group based on at least one of the instruction, the result of image analysis on images contained in the first image group and a result of image analysis on images contained in the third image group, with a utilization determiner; and a step of presenting on a terminal device of the first user a display recommending utilization of the third image group in accordance with the way of utilization to the first user, with a recommendation section, wherein the way of utilization of the third image group includes at least one of sharing the third image group with other users, ordering prints of the third image group, and creating a synthetic image using the third image group.

24. An image processing device comprising a computer, wherein the computer comprises:

an instruction acquiring processor that acquires an instruction input by a first user;

an image group selecting processor that selects, as a second image group, a part of images from a first image group owned by the first user based on the instruction;

an image analyzing processor that carries out image analysis on images contained in the first image group;

an image group extracting processor that extracts, as a third image group, at least a part of images having relevance to images contained in the second image group from the first image group except the second image group based on a result of image analysis on images contained in the first image group;

a utilization determining processor that determines a way of utilization of the third image group based on at least one of the instruction, the result of image analysis on images contained in the first image group and a result of image analysis on images contained in the third image group; and a recommendation processor that presents on a terminal device of the first user a display recommending utilization of the third image group in accordance with the way of utilization to the first user, wherein the way of utilization of the third image group includes at least one of sharing the third image group with other users, ordering prints of the third image group, and creating a synthetic image using the third image group.

25. An image processing method comprising:

acquiring an instruction input by a first user, with an instruction acquiring processor of a computer;

selecting, as a second image group, a part of images from a first image group owned by the first user based on the instruction, with an image group selecting processor of the computer;

carrying out image analysis on images contained in the first image group, with an image analyzing processor of the computer;

extracting, as a third image group, at least a part of images having relevance to images contained in the second image group from the first image group except the second image group based on a result of image analysis on images contained in the first image group, with an image group extracting processor of the computer;

determining a way of utilization of the third image group based on at least one of the instruction, the result of image analysis on images contained in the first image group and a result of image analysis on images contained in the third image group, with a utilization determining processor of the computer; and presenting on a terminal device of the first user a display recommending utilization of the third image group in accordance with the way of utilization to the first user, with a recommendation processor of the computer, wherein the way of utilization of the third image group includes at least one of sharing the third image group with other users, ordering prints of the third image group, and creating a synthetic image using the third image group.

* * * * *